United States Patent
Mehas et al.

(10) Patent No.: US 7,088,600 B2
(45) Date of Patent: Aug. 8, 2006

(54) STARTUP VIA FB PIN REGULATION

(75) Inventors: Gustavo J. Mehas, Mercer Island, WA (US); James W. Leith, Seattle, WA (US); Brandon D. Day, Seattle, WA (US)

(73) Assignee: Intersil Americas, Inc., Milpitas, CA (US)

( * ) Notice: Subject to any disclaimer, the term of this patent is extended or adjusted under 35 U.S.C. 154(b) by 119 days.

(21) Appl. No.: 10/915,906

(22) Filed: Aug. 11, 2004

(65) Prior Publication Data

US 2005/0206360 A1    Sep. 22, 2005

Related U.S. Application Data

(60) Provisional application No. 60/553,766, filed on Mar. 16, 2004.

(51) Int. Cl.
    *H02M 1/00*    (2006.01)

(52) U.S. Cl. .................... 363/49; 323/901
(58) Field of Classification Search ............... 323/901, 323/282; 363/49
    See application file for complete search history.

(56) References Cited

U.S. PATENT DOCUMENTS

| | | | | |
|---|---|---|---|---|
| 6,091,234 A | * | 7/2000 | Kitagawa | ............ 323/244 |
| 6,100,677 A | * | 8/2000 | Farrenkopf | .......... 323/285 |
| 6,815,938 B1 | * | 11/2004 | Horimoto | ............ 323/282 |
| 6,933,710 B1 | * | 8/2005 | Shieh | ................. 323/282 |
| 6,965,223 B1 | * | 11/2005 | MacLean et al. | ....... 323/284 |

\* cited by examiner

*Primary Examiner*—David M. Gray
*Assistant Examiner*—Harry R. Behm
(74) *Attorney, Agent, or Firm*—Howison & Arnott, LLP

(57) ABSTRACT

An apparatus for reducing surge currents during startup of a voltage regulator is disclosed that includes circuitry for maintaining a voltage at an FB pin of the voltage regulator substantially equivalent to an output voltage of the voltage regulator.

14 Claims, 3 Drawing Sheets

STARTUP VIA FB PIN REGULATION

CROSS-REFERENCE TO RELATED APPLICATIONS

This application is related to pending U.S. Provisional Patent Application Ser. No. 60/553,766, filed on Mar. 16, 2004 entitled "STARTUP VIA FB PIN REGULATION."

TECHNICAL FIELD OF THE INVENTION

The present invention relates to startup surge currents, and more particularly, to a method for reducing startup surge currents.

BACKGROUND OF THE INVENTION

During startup of a voltage regulator, the reference voltage applied to the voltage regulator goes from 0V to 1.2V. If the reference voltage is turned on quickly, surge currents that are induced in the inductor associated with the voltage regulator can damage components of the voltage regulator and additionally cause a collapse of the input power supply by drawing too much current during the turn on process. It is greatly desired to reduce the surge currents during startup of the voltage regulator to prevent these actions from occurring. One method used to prevent surge currents has been the use of a soft start function that slowly ramps the reference voltage of the regulator from 0V to VREF. One problem with the slow startup method is the creation of a voltage offset with respect to VOUT on the FB pin due to initial movement of voltages in the COMP pin at startup enable (open loop operation) which is capacitively coupled to the FB pin. When an error amplifier within a voltage regulator is enabled, the voltage on the COMP pin may jump from 0V to 0.6V. Since the COMP pin is capacitively coupled to the FB pin, this will normally produce a voltage offset at the FB pin. The jump of voltage on the COMP pin is one source of the offset voltage at the FB pin.

During the actual slow start ramp process, the COMP pin will move from 0.6V up to a predetermined voltage level wherein operation of the voltage regulator enters linear operation (closed loop operation). While the COMP pin is moving up to the predetermined level, it will capacitively couple this voltage onto the FB pin. This is a second source of voltage injection into the FB pin. The voltage offset on the FB pin eventually discharges when the system enters closed loop operation. The discharge of the FB pin to VOUT reinforces with the soft start ramp resulting in an increased input current which can be sufficiently large to exceed the surge current specification for the regulator. The voltage charge is impressed onto the compensation loop which impresses the voltage upon the FB pin. When a pre-biased startup voltage is used, this can increase the amount of voltage impressed onto the compensation loop and the FB pin and further increase the surge currents on the FB pin during startup.

SUMMARY OF THE INVENTION

The present invention disclosed and claimed herein, in one aspect thereof, comprises an apparatus for reducing surge currents during startup of a voltage regulator. The circuitry is connected to the FB pin of the voltage regulator to maintain the voltage at the FB pin substantially equivalent to the output voltage of the voltage regulator. This acts to reduce the surge currents into the FB pin of the voltage regulator and protects the circuitry therein.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
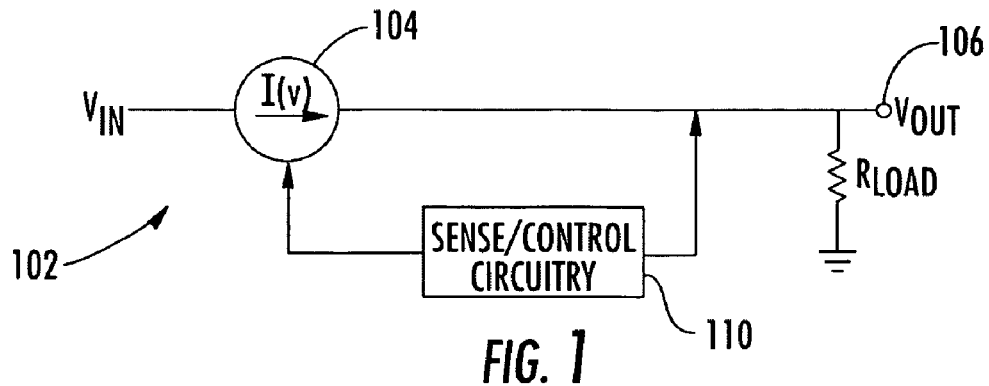
FIG. 1 is a functional block diagram of a voltage regulator circuit.

Referring now to the drawings, and more particularly to FIG. 1, there is illustrated a voltage regulator circuit 102. Every electronic circuit is designed to operate off of some type of voltage supply which is assumed to be constant. A voltage regulator provides this constant DC output voltage and contains circuitry that continuously holds the output voltage at the designed value regardless of changes in load current or input voltage. A voltage regulator operates by using a voltage controlled current source 104 to force a fixed voltage to appear at the regulator output terminal 106. A sense/control circuitry 110 monitors the output voltage, and adjusts the current source 104 to hold the output voltage at the desired level. The design limit of the current source 104 defines the maximum load current the voltage regulator 102 can source and still maintain regulation.

The output voltage is controlled using a feedback loop which requires some type of compensation to assure loop stability. Most voltage regulators have built-in compensation and are completely stable without external components. Some regulators require some external capacitance connected from the output lead to ground to ensure regulator stability. Another characteristic of a voltage regulator is that it requires a finite amount of time to correct the output voltage after a change in a load current demand. The time lag defines the characteristic transient response of the voltage regulator, which is a measure of how fast the voltage regulator returns to steady state conditions after a load change. Voltage regulation may be used in any number of electronic devices to control an output voltage.

Figure 2:
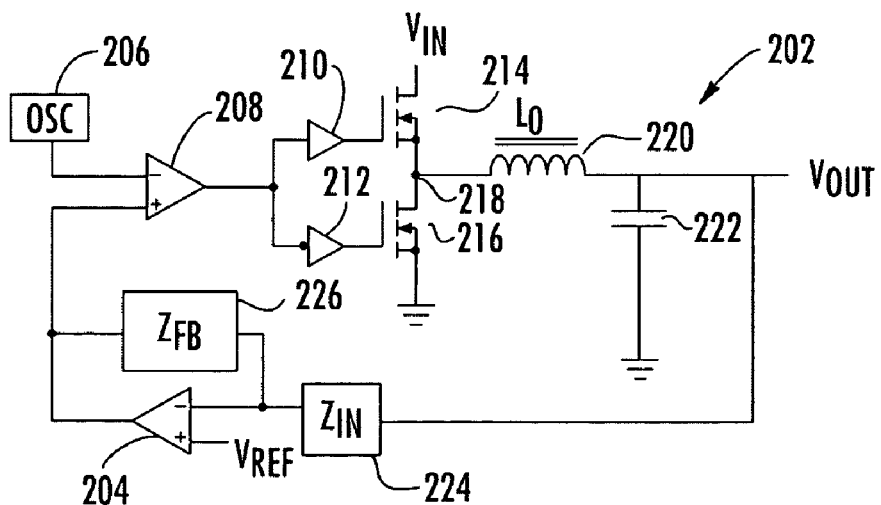
FIG. 2 is a schematic block diagram of a voltage regulator with a PWM converter circuit.

Referring now to FIG. 2, there is illustrated a voltage regulator within a PWM DC-DC converter circuit 202. The output voltage VOUT is regulated to the reference voltage signal VREF applied to a positive input of error amplifier 204. The error amplifier 204 output is compared with the output of oscillator 206, which is a triangular wave, at the PWM comparator 208. The output of the PWM comparator 208 is applied to driver circuits 210 and 212, which drive the gates of transistors 214 and 216. This process provides a pulse width modulated waveform with an amplitude of $V_{IN}$ at a phase node 218 connected to a first side of inductor 220. The PWM waveform provided from phase node 218 is smoothed by an output filter consisting of inductor 220 and capacitor 222. The error amplifier 204 has an input impedance $Z_{IN}$ 224 and an FB pin impedance $Z_{FB}$ at 226. The input impedance 224 and the FB pin impedance 226 comprise a compensation loop for the error amplifier 204.

Figure 3:
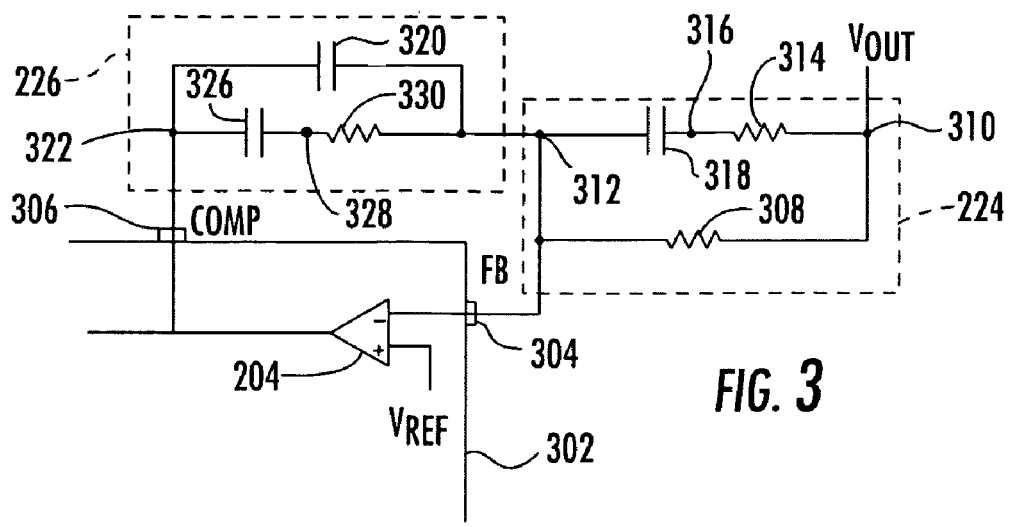
FIG. 3 is a schematic diagram of an error amplifier of a voltage regulator and its associated compensation loop, including its FB and COMP pins.

The FB pin, COMP pin and compensation loop of the voltage regulator are more fully illustrated in FIG. 3. FIG. 3 illustrates a device 302 including an error amplifier 204 of a voltage regulator. The error amplifier 204 of the voltage regulator has the negative input of the error amplifier 204 connected to the FB pin 304, and the output of the error amplifier 204 connected to the COMP pin 306. The compensation loop of the error amplifier 204 consists of impedance $Z_{FB}$ 226 and input impedance $Z_{IN}$ 224 as described with respect to FIG. 2. The input impedance 224 consists of a resistor 308 connected between the VOUT node 310 and node 312 connected to FB pin 304. Connected in parallel with resistor 308 are a resistor 314 connected between node 310 and node 316, and a capacitor 318 connected between node 316 and node 312. Impedance $Z_{FB}$ includes a capacitor 320 connected between node 322 connected to the COMP pin 306 and node 312 connected to the FB pin 304. In parallel with capacitor 320 are a capacitor 324 between node 322 and node 328 and a resistor 330 between node 328 and node 312.

As mentioned previously, when the error amplifier 204 is enabled, the output of the error amplifier and COMP pin 306 jumps from 0V to 0.6V. As the COMP pin 306 is capacitively coupled to the FB pin 304, a voltage offset is produced at the FB pin 304. During the slow start ramp-up, the COMP pin 306 moves from 0.6V to a predetermined level at which the voltage regulator enters linear operation. While the COMP pin 306 is moving from 0.6V to the predetermined level, the COMP pin 306 capacitively couples this voltage onto the FB pin 304. This is a second source of voltage injection into the FB pin 304. The charges impressed on the capacitors of the compensation loop are one source of the surge currents that need to be avoided. By regulating the voltage at the FB pin 304 to equal to the equivalent output voltage VOUT during startup, the effects caused by the voltage applied from the capacitively coupled COMP pin 306 to the FB pin 304 may be minimized, thus reducing surge currents during startup.

Figure 4:
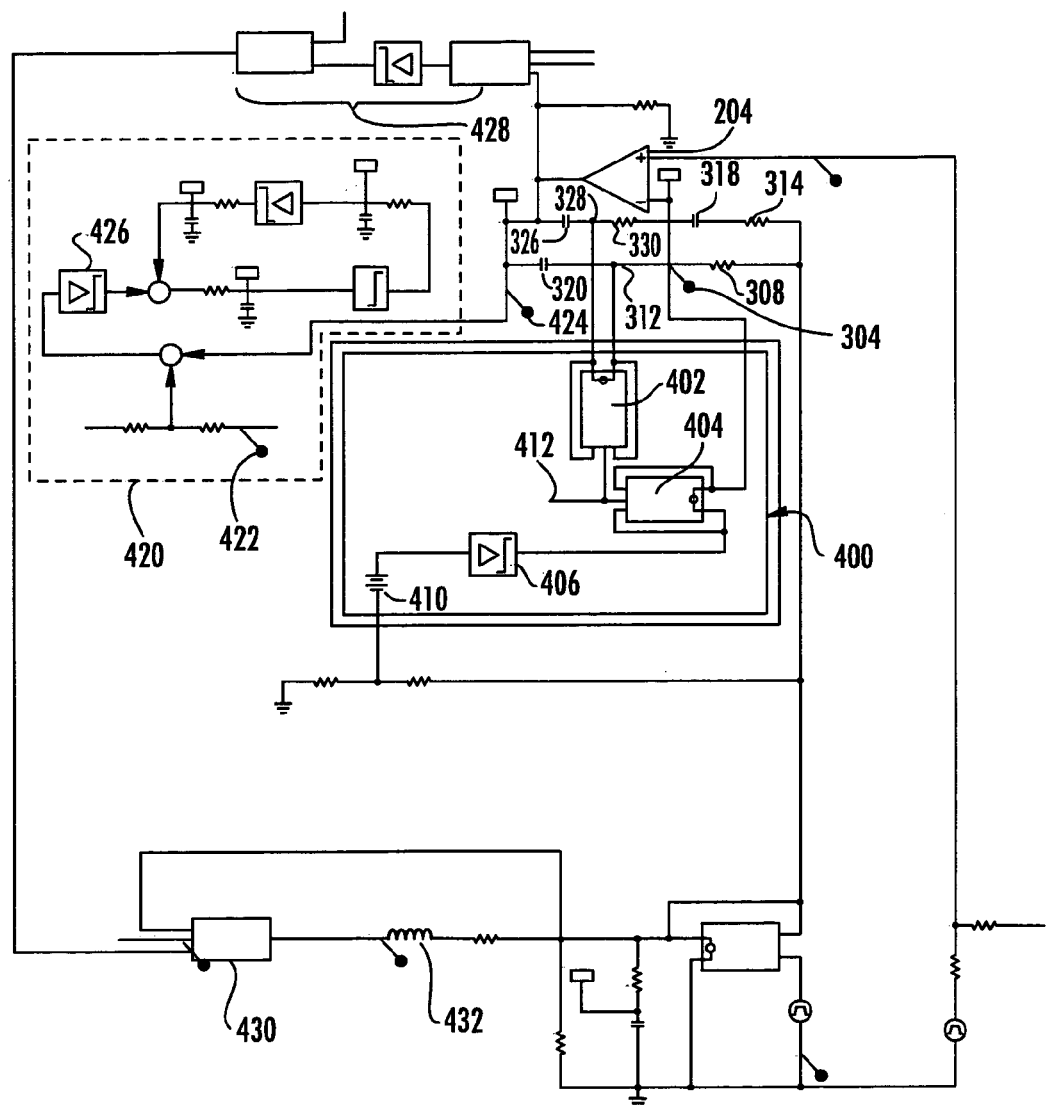
FIG. 4 is a schematic diagram of a simulation of the method for reducing surge currents at startup using FB pin regulation.

By regulating the FB pin of the voltage regulator to equal the equivalent output voltage at startup, the pre-charging effects of the compensation network capacitors are removed and surge currents are reduced. A schematic diagram of a simulation including the circuitry 400 for carrying out this process is more fully illustrated in FIG. 4. The circuitry 400 for regulating the voltage on the FB pin 304 includes a first shorting bar 402, a second shorting bar 404 and a regulator 406. The first shorting bar 402 is connected to node 328 between capacitors 326 and 330 and to node 312 connected to the FB pin 304. The second shorting bar 404 is connected to node 312 connected to the FB pin 304 and to the output of the regulator 406. The regulator 406 comprises an operational amplifier. The input of regulator 406 is connected to a voltage source 410 providing a 3 mV offset to the circuitry 400. Each of the shorting bars are also connected to receive a drive enable signal at input 412. The drive enable signal causes each of the shorting bars to alternate between a first resistance and a second resistance. This activates and deactivates the circuitry 400. The shorting bars 402 and 404 comprise idealized resistors that in a preferred embodiment, alternate between a 10 MΩ value and a 10Ω value. The shorting bars short the capacitors of the compensation loop to remove charge from the compensation loop, thus limiting surge currents to the FB pin 304. It should be noted that an internal compensation loop would need no external pins.

The circuitry 400 contains a 3 mV offset to guarantee that at startup into the 0V output condition, the FB pin 304 is always above the non-inverting input to the error amplifier 204. This forces the output of the error amplifier 204 low at startup. During startup, while the slow start ramp of the reference voltage is occurring, the circuitry 404 is enabled by the drive enable signal and maintains the voltage of the FB pin 304 close to the output of voltage node $V_{OUT}$. When the regulator enters linear operation and/or close loop operation, the circuitry 400 is disabled by the device enable signal, enabling normal compensated operation to occur.

While the drive enable signal is described as enabling and disabling the circuitry 400, any control signal may be used that will enable the circuitry 400 during startup and disable the circuitry 400 after startup. The circuitry 400 prevents a large voltage offset from being impressed upon the FB node 304 and substantially reduces the surge current. The circuitry 400 need only remove voltage impressed upon the FB node, the design can, under most situations, be simplified to a shunt type regulator. For more complex compensation networks, it may be necessary to remove the charge from additional nodes in the network. An extra pin may be required for these types of networks. Simple shorting devices could be used instead of additional regulators. In applications where there is no FB resistor divider, a regulator is not necessary and shorting bars can perform the required FB pin discharging. Some applications may require an additional pin to implement this particular methodology.

Circuitry 420 comprises pre-biased startup circuitry. When the value of the output from the COMP pin 422 equals the value from the COMP target pin 424, this triggers the op amp 426 and the drive enable signal 428 goes from 0V to 1V using the slow startup procedures. This activates the pre-biased startup to start switches within the voltage regulator and activates the circuitry 400 by providing the drive enable signal to the inputs of the shorting bars 402,404. This enables the drivers, which start driving the switches of the regulator. Block 428 is a state average model with feed forward compensation that determines the duty cycle from 0V to 1V. Block 430 emulates the drivers of the voltage regulator to the inductor 432.

Figure 5:
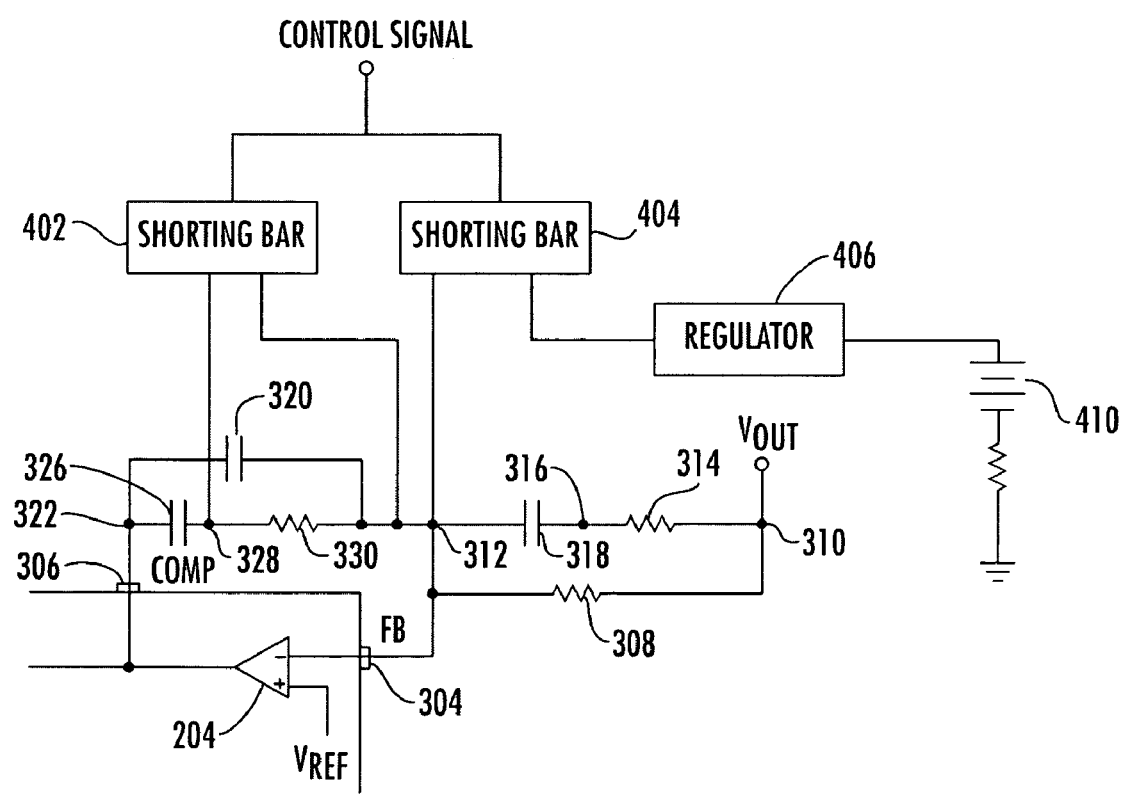
FIG. 5 is a schematic block diagram of the surge current reducing circuitry connected to a compensation loop.

Referring now to FIG. 5, there is illustrated a schematic block diagram of the circuitry 400 interconnected to the compensation loop illustrated in FIG. 3. As described previously with respect to FIG. 3, the compensation loop between the COMP pin 306 and the FB pin 304 consists of capacitor 320 connected between node 322 and node 312, capacitor 326 connected between node 322 and 328, resistor 330 connected between node 328 and 312, resistor 308 connected between node 310 and 312, resistor 314 connected between node 310 and the node 316, and capacitor 318 connected between node 316 and node 312. The shorting bars 402 and 404 are interconnected with the compensation loop to remove the charge from capacitors 326, 320 and 316 to maintain the voltage at FB pin 304 substantially equal to that of the voltage at node 310. The shorting bar 402 is connected to node 328 and to node 312. The shorting bar 404 is connected to node 312 and to the output of regulator 406. Regulator 406 has its input connected to a voltage source 410 which provides the voltage offset to the circuitry 400. Control signals for turning on and off the circuitry 400 are applied to shorting bar 402 and shorting bar 404.

Although the preferred embodiment has been described in detail, it should be understood that various changes, substitutions and alterations can be made therein without departing from the scope of the invention as defined by the appended claims.

What is claimed is:

1. An apparatus for reducing surge currents during startup of a voltage regulator, comprising:
   circuitry connected to a compensation loop of the voltage regulator for maintaining a voltage at an FB pin of the voltage regulator substantially equivalent to a voltage at a $V_{out}$ pin of the voltage regulator by removing charge stored on capacitors in the compensation loop;

wherein the circuitry is enabled responsive to a control signal at a first level when the voltage regulator is in a startup mode of operation and the circuitry is disabled responsive the control signal at a second level when the voltage regulator enters at least one of linear operation or closed loop operation.

2. The apparatus of claim 1, wherein the circuitry prevents a voltage offset from being impressed on the FB pin.

3. The apparatus of claim 1, wherein the circuitry further comprises:
   at least one shorting bar for shorting capacitors of the compensation loop to remove charge from the compensation loop; and
   a regulator connected to one of the at least one shorting bar for providing a predetermined offset to the circuitry such that the circuitry maintains the inverting input of the error amplifier above the non-inverting input of the error amplifier during the startup mode.

4. The apparatus of claim 3, wherein the at least one shorting bar comprises an idealized resistor.

5. The apparatus of claim 3, wherein the at least one shorting bar provides a first resistance value responsive to the control signal at the first level and the second resistance value responsive the control signal at a the second level.

6. A voltage regulator, comprising:
   circuitry for regulating an output voltage responsive to an input voltage;
   an error amplifier for detecting a difference between the output voltage and a reference voltage;
   a first pin connected to an output of the error amplifier;
   a second pin connected to an inverting input of the error amplifier; and
   circuitry connected to a compensation loop of the voltage regulator for maintaining a voltage at the second pin of the voltage regulator substantially equivalent to the output voltage of the voltage regulator by removing charge stored on capacitors in the compensation loop;
   wherein the circuitry is enabled responsive to a control signal at a first level when the voltage regulator is in a startup mode of operation and the circuitry is disabled responsive the control signal at a second level when the voltage regulator enters at least one of linear operation or closed loop operation.

7. The voltage regulator of claim 6, wherein the circuitry prevents a voltage offset from being impressed on the second pin.

8. The voltage regulator of claim 6, wherein the circuitry further comprises:
   at least one shorting bar for shorting capacitors of the compensation loop to remove charge from the compensation loop; and
   a regulator connected to one of the at least one shorting bar for providing a predetermined offset to the circuitry such that the circuitry maintains the inverting input of the error amplifier above the non-inverting input of the error amplifier during the startup mode.

9. The voltage regulator of claim 8, wherein the at least one shorting bar comprises an idealized resistor.

10. The voltage regulator of claim 8, wherein the at least one shorting bar provides a first resistance value responsive to the control signal at the first level and the second resistance value responsive the control signal at a the second level.

11. A voltage regulator, comprising:
    circuitry for regulating an output voltage responsive to an input voltage;
    an error amplifier for detecting a difference between the output voltage and a reference voltage;
    a first pin connected to an output of the error amplifier;
    a second pin connected to an inverting input of the error amplifier;
    a compensation loop connected between the first pin and the second pin;
    circuitry connected to a compensation loop of the voltage regulator for maintaining a voltage at the second pin of the voltage regulator substantially equivalent to the output voltage of the voltage regulator by removing charge stored on capacitors in the compensation loop, wherein the circuitry is enabled responsive to a control signal at a first level when the voltage regulator is in a startup mode of operation and the circuitry is disabled responsive the control signal at a second level when the voltage regulator enters at least one of linear operation or closed loop operation, said circuitry including:
       at least one shorting bar for shorting capacitors of the compensation loop to remove charge from the compensation loop; and
       a regulator connected to one of the at least one shorting bar for providing a predetermined offset to the circuitry such that the circuitry maintains the inverting input of the error amplifier above the non-inverting input of the error amplifier during the startup mode.

12. The voltage regulator of claim 11, wherein the circuitry prevents a voltage offset from being impressed on the second pin.

13. The voltage regulator of claim 11, wherein the at least one shorting bar comprises an idealized resistor.

14. The voltage regulator of claim 11, wherein the at least one shorting bar provides a first resistance value responsive to the control signal at the first level and the second resistance value responsive the control signal at a the second level.

* * * * *